March 1, 1960     J. FUHRMANN ET AL     2,926,804
LIFT CART
Filed Aug. 21, 1957     2 Sheets-Sheet 2
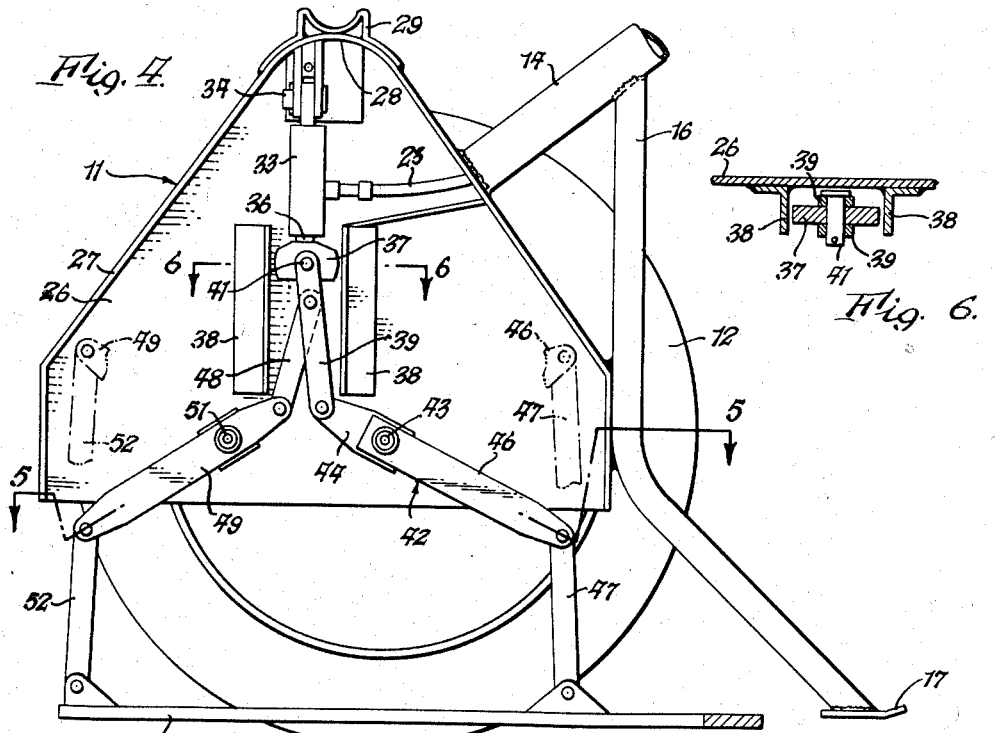
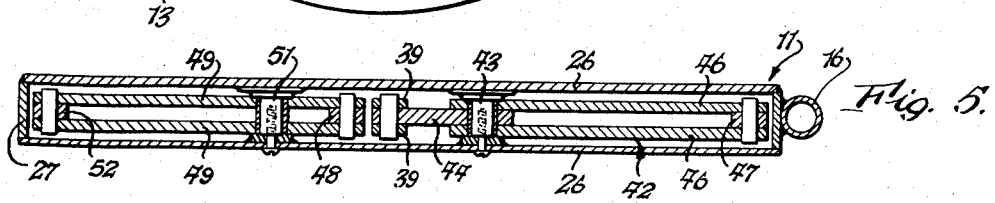
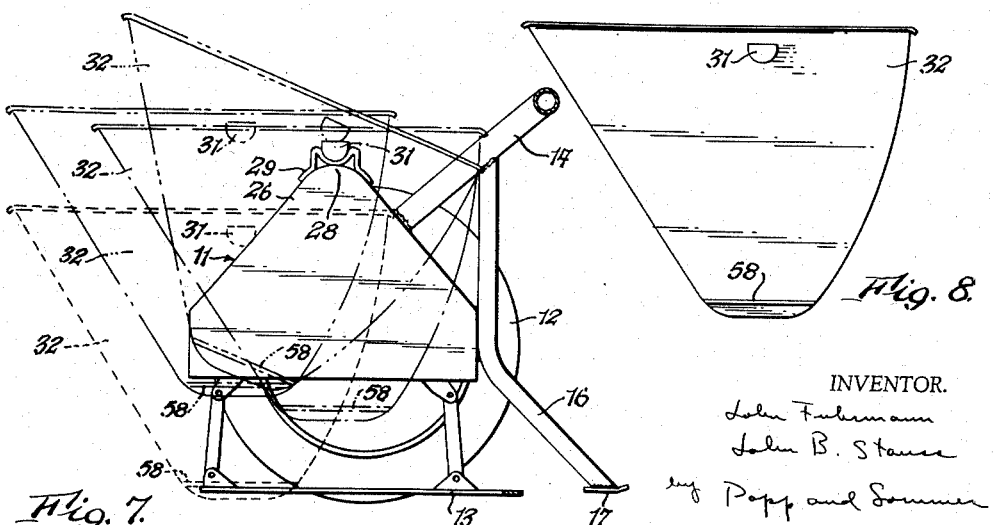
INVENTOR.
John Fuhrmann
John B. Stauss
by Popp and Sommer
ATTORNEYS

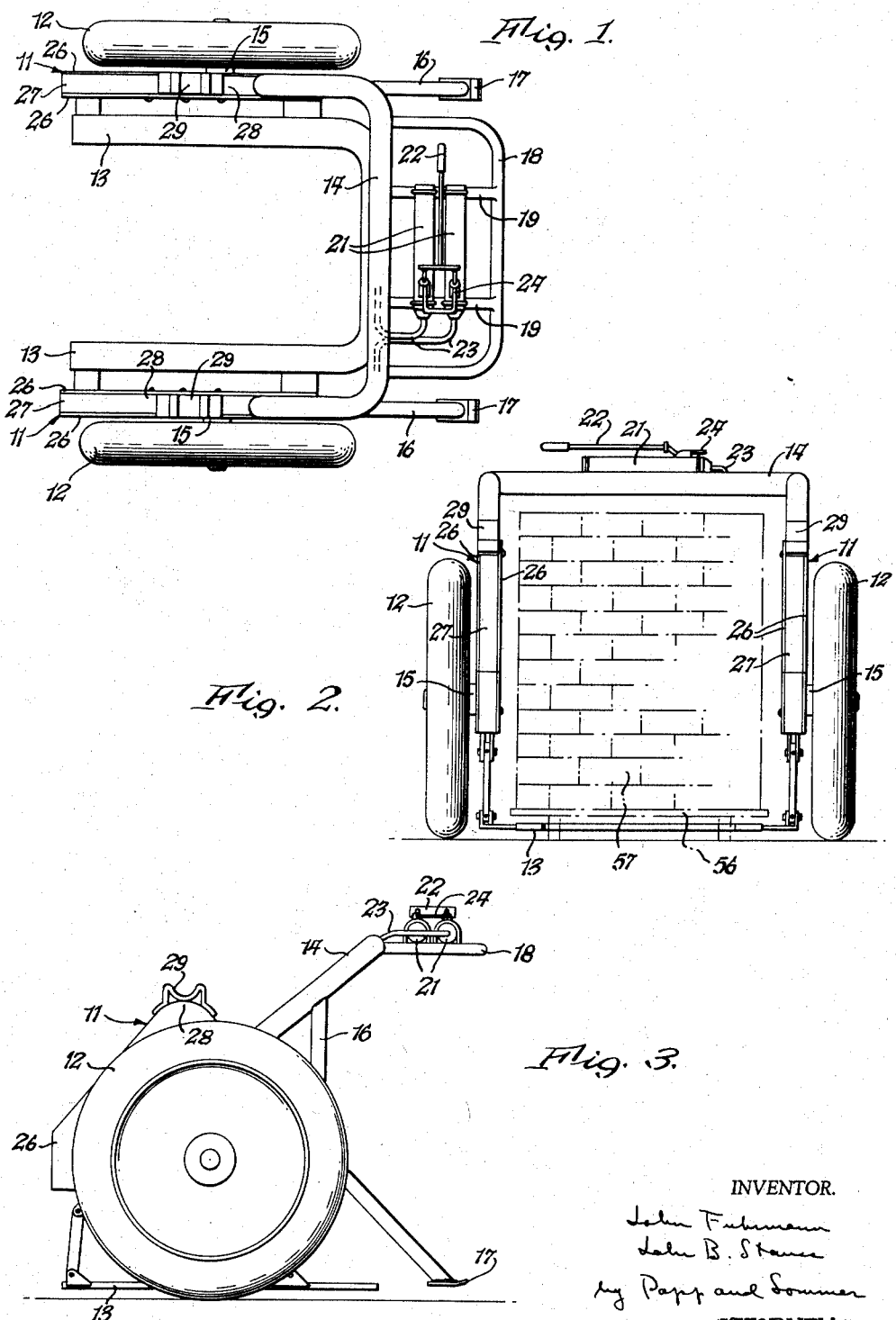

United States Patent Office 2,926,804
Patented Mar. 1, 1960

2,926,804

LIFT CART

John Fuhrmann, West Seneca, and John B. Stauss,
Elma, N.Y.

Application August 21, 1957, Serial No. 679,445

4 Claims. (Cl. 214—390)

This invention relates to a lift cart and more particularly to a manually operated cart for use in transporting building construction materials such as bricks, mortar, and the like.

In our copending application Serial No. 569,539, filed March 5, 1956, now Patent No. 2,836,315, we disclosed a truck for conveniently conveying building materials under conditionis as generally existent at building construction sites. The present invention, while having certain objectives in common with those set forth in our copending application, represents an improvement characterized by a further simplification of structure, and more particularly wherein the platform lifting mechanism is totally enclosed thereby providing full protection against deterioration or damage due to inclement weather or difficult working conditions, also providing protection against personal injury during operation of the platform lifting mechanism.

Another feature of the lift cart of the invention resides in a linkage mechanism for raising and lowering a load carrying platform, which linkage mechanism provides high capacity lifting, and smooth operation with a minimum of swaying of the load during cart movement.

The main object of this invention is to provide a lift cart for use in building construction for the convenient transporting of building supplies such as bricks, mortar and the like.

A further object of this invention is to provide a simplified lift cart for use in building construction which may be used for transporting material upon uneven surfaces, on scaffolding and temporary flooring, through narrow doorways, and under other conditions as generally exist at building sites.

Another object of the invention is to provide a lift cart having a platform lifting mechanism which is totally enclosed thereby affording protection against deterioration or damage due to inclement weather or difficult working conditions, also providing protection against personal injury during operation of the platform lifting mechanism.

Another object is to provide a lift cart having a linkage arrangement for a load carrying platform which linkage ararngement has a high lift capacity, smooth operation, and functions with minimum sway of load during cart movement.

Another object is to provide a lift cart having means for supportingly receiving a container for transporting materials such as mortar.

These and further objects and features of the invention will become more apparent from the following description and the accompanying drawings wherein:

Fig. 1 is a plan view of a lift cart embodying the principles of the invention;

Fig. 2 is a front view of the lift cart of Fig. 1;

Fig. 3 is a side view of the lift cart of Fig. 1;

Fig. 4 is a side view partly in section of the lift cart of Fig. 1;

Fig. 5 is a section view generally as seen along lines 5—5 in Fig. 4;

Fig. 6 is a section view generally as seen along lines 6—6 in Fig. 4;

Fig. 7 is a view of the lift cart illustrating its use for hauling a bucket of mortar; and Fig. 8 is a view of the mortar bucket shown in Fig. 7.

Referring now to the drawings and more particularly to Figs. 1 to 3, a lift cart embodying the principles of the invention includes a pair of parallel arranged side housings or side frame members 11, a large diameter rubber-tired wheel 12 affixed to the outside of each housing 11 by means of a stub axle 15, a load carrying U-shaped platform or load supporting mechanism 13 with the open end being toward the front of the cart, a tubular framework consisting of a U-shaped member 14 each end of which is welded to a housing 11, and a curved member 16 welded to the U-shaped member 14 at one end and to a housing 11 at the mid-point thereof, the free end of each curved member 16 extending downwardly in close proximity to the ground and having a flat plate 17 secured thereupon. It is to be noted that the platform is arranged so that the center of gravity of a load carried thereupon will be in substantial vertical alignment with the axis of the wheels 12. A handle arrangement, comprising a U-shaped tubular member 18 and inner members 19, is secured to the U-shaped member 14. The inner members 19 support a pair of hydraulic cylinders 21 incorporating a pumping mechanism having a handle 22 for pumping liquid from the cylinders under pressure and through pipes 23 to a mechanism for lifting the platform 13, and a pressure release handle 24 for release of hydraulic pressure by return flow of hydraulic fluid into the cylinders 21, whereby the platform will descend under its own weight.

Each side housing includes parallel side walls 26 which are maintained in spaced relation by an interconnecting piece 27 extending about the periphery of the side walls except at the bottom which is maintained open. The upper end of each housing 11 tapers to a rounded point 28 which has affixed to the outer surface thereof a bracket 29 curved to provide an upwardly opening retaining seat adapted for receipt of lugs, or ears 31, of a bucket 32. A hydraulic ram 33 is pivotally suspended from a pin 34 arranged within the housing in the region of the rounded point 28. A vertically movable member in the form of a piston 36 extends from the lower end of the ram 33 and is affixed to a cross head, or guide block 37, arranged for sliding movement between vertically arranged L-shaped guide rail members 38. A pair of links 39 are pivotally secured by means of a pin 41 to the guide block 37, the lower end of the links 39 being pivotally affixed to the short end of a first class lever 42 which is pivoted about a pin 43 secured between the housing side walls 26. The lever 42 consists of a single arm 44 arranged between the pin 43 and the connection to the links 39, and a pair of arms 46 arranged between the pin 43 and a pivoted connection with a link 47, the latter of which is pivoted at its lower end to the platform 13. Pivotally connected at one end between the links 39 is a link 48, which has its lower end pivotally connected to a lever assemblage 49 comprising a lever of the first class type. The lever assemblage 49 consists of parallel arranged levers which are rotatably mounted upon a pin 51 affixed to the side housings 11, the long end of the lever assemblage 49 being pivotally connected to a link 52, the lower end of the latter being pivotally secured to the platform 13, all as best seen in Fig. 4. Links 47 and 52 slope slightly in opposition to counter penduluming of platform 13.

It will be thus seen that the side housings 11, enclose the operative parts of the mechanism for lifting the platform 13, thereby providing full protection against deterioration or damage due to inclement weather or difficult working conditions, and which also provide protection against personal injury during operation of the platform lifting mechanism.

A hydraulic pipe 23 is connected to a hydraulic ram 33, whereby hydraulic pressure generated by a cylinder 21 will cause a downward movement of the ram piston 36, to rock the levers 42 and 49 inwardly about the pins 43 and 51 respectively. Such action will result in the upward movement of the platform 13 during which the links 47 and 52 will be drawn upwardly within the housings 11. In such position the pendulum movement of the platform 13 will be restricted by reason of the relatively narrow clearance between the links 47 and 52 with the inner surface of the interconnecting piece 27, while lateral movement of said platform will be prevented by the narrow clearance between the links 47 and 52 with the inner surface of the side walls 26. In such manner, pendulum or swaying movement of the platform 13, will be maintained at a minimum.

In operation, the lift cart is moved so that the cart platform 13 is positioned beneath a platform 56 which supports a load of bricks 57, as illustrated in Fig. 2. The handle 22 of the hydraulic cylinders 21 is then reciprocated to cause flow of pressurized liquid in the pipes 23 and to the hydraulic ram 33 located in each side housing 11, to thereby cause the upward movement of the cart platform 13, and the lifting of the palletized load of bricks. After the load is raised a sufficient amount for clearance with the ground, the cart is pushed to the point of delivery, and after the load is positioned as desired, the pressure release handle 24 is operated resulting in the downward movement of the cart platform 13, whereby the palletized load of bricks will eventually come to rest upon the ground, or supporting surface. The cart is then moved backward so that the cart platform 13 clears the load carrying platform 56, whereupon the cart may be moved back to the point of loading. During the return trip the platform 13 may be elevated for ground clearance if necessary.

The use of the lift cart of the invention for transporting mortar or the like, may be accomplished by utilization of a container, such as the bucket 32 illustrated in Figs. 7 and 8. The bucket 32, which tapers toward the bottom, has a pair of flanges 58 projecting outwardly on each side near the bottom, which are of such length as to be engaged by the U-shaped platform 13. For transporting a bucket of mortar, the cart is moved so that the platform 13 is positioned beneath the flanges 58 of the bucket, and the platform is elevated by reciprocal movement of the handle 22, to cause upward movement of the cart platform 13. Such upward movement will be continued until the ears 31 of the bucket 32 are above the brackets 29 mounted atop each side housing 11. The bucket is then manually rotated so that the ears 31 are in vertical alignment with the brackets 29, whereupon the platform 13 is lowered resulting in the seating of the ears 31 within the curved brackets 29. Further downward movement of the platform 13 will result in the disengagement of the platform 13 with the bucket flange 58, whereupon the bucket will be suspended by its ears 41 within the brackets 29 of the cart. The cart may be then moved to the point of deposit of the mortar, whereupon the bucket may be rotated upon its ears 31 to dump the mortar into a pan, or other container for use by the one using the mortar.

From the foregoing it will be seen that the lift cart of the invention may be conveniently used for transporting building supplies under conditions which generally prevail at building sites. By the use of palletized loads of bricks, the handling thereof can be accomplished in a very efficient manner, it being found in practice that the use of the cart of the invention for such purposes alone result in a 60% reduction in labor compared to more conventional methods of handling. The feature of the side housings for totally enclosing the platform lifting mechanism affords protection thereto against deterioration or damage due to inclement weather or difficult working conditions, and also provides protection against personal injury during operation of the platform lifting mechanism. The further feature of the cart which allows a complete turning within its own length provides greater maneuverability so that the cart can easily be moved over a tortuous path in transporting material to its point of destination. Furthermore, it is to be noted that the arrangement of the platform whereby the center of gravity of the load being transported is in substantially vertical alignment with the axles of the wheels 12, results in easy movement of the cart so that the operator is relieved of the necessity of balancing the load, and also wherein such arrangement eliminates the danger of the load tipping from the cart platform.

The foregoing description has been given in detail without thought of limitation since the inventive principles involved are capable of assuming other physical embodiments without departing from the spirit of the invention and the scope of the appended claims.

What is claimed is:

1. In a hand propelled, two wheel lift cart for transporting a load of building material and having a pair of axially spaced, parallel, ground engaging side wheels forming the sole wheeled support for the cart, a pair of spaced, parallel vertical side frame members arranged between said wheels and each adjacent a corresponding wheel, means supporting each side frame member on its associated wheel, means connecting said side frame members, a load supporting mechanism disposed between said side frame members for movement vertically with respect thereto; the combination therewith of means for lifting said load supporting mechanism with reference to each of said side frames, comprising a pair of generally vertical links severally pivoted at their lower ends to the bottom of said load supporting mechanism at the front and rear thereof and swinging fore-and-aft, a pair of first class levers fulcrumed on the lower part of each of said side frames to swing about axes generally parallel with the axis of said wheels and each pivoted at one end to the upper end of a corresponding one of said links, the opposite ends of said levers opposing each other, a vertically movable member arranged adjacent and in vertically spaced relation to said opposing ends of said levers, a second pair of links pivotally connected together at one end and having their other ends severally pivoted to said opposing ends of said levers, means connecting said vertically movable member with said one end of said second pair of links, guide means on each side frame compelling said one end of said second pair of links to move in a vertical path, and manually operable means for actuating said vertically movable member.

2. The combination set forth in claim 1 wherein said connecting means between each vertically movable member and said one end of the corresponding second pair of links comprises a guide block, and wherein said guide means comprises a pair of spaced vertical guide rails on each side frame in front and in rear of the corresponding guide block.

3. In a hand propelled, two wheel lift cart for transporting a load of building material and having a pair of axially spaced, parallel, ground engaging side wheels forming the sole wheeled support for the cart, a pair of spaced, parallel vertical side frame members arranged between said wheels and each adjacent a corresponding wheel, means supporting each side frame member on its associated wheel, means connecting said side frame members, a load supporting mechanism disposed between said side frame members for movement vertically with respect thereto; the combination therewith of means for lifting said load supporting mechanism with reference to each of said side frames, comprising a pair of generally vertical links severally pivoted at their lower ends to the bottom of said load supporting mechanism at the front and rear thereof, a pair of first class levers fulcrumed on said side frames in a horizontal plane above the upper ends of said pair of links to swing about spaced axes generally parallel with the axis of said wheels and each pivoted at one end to the upper end of a corresponding link, the opposite ends of said levers opposing each other, a vertically movable member arranged adjacent and above said opposing ends of said levers, a second pair of links connected at their upper ends with said vertically movable member and pivotally connected at their lower ends with said opposing ends of said levers, guide means on each side frame compelling said upper ends of said second pair of levers to move in a vertical path and manually operable means for actuating said vertically movable member.

4. A hand propelled, two wheel lift cart for transporting a load of building material, comprising a pair of axially spaced, parallel, ground engaging side wheels forming the sole wheeled support for the cart, a pair of spaced, parallel vertical side frame members arranged between said wheels and each adjacent a corresponding wheel, the upper extremities of said side frame members being arranged adjacent the upper extremities of said wheels, means supporting each side frame member on its associated wheel, means connecting said side frame members, a vertically movable platform disposed between said side frame members adjacent the ground, lift means carried by each side frame for supporting and lifting said platform, a bracket providing an upwardly opening retaining seat mounted on the upper part of each side frame, and a material container having lugs on opposite sides engageable with said brackets to be supported thereby and having its bottom engageable with said platform whereby said lugs can be freed from said brackets by elevating said platform.

References Cited in the file of this patent

UNITED STATES PATENTS

| Number | Name | Date |
|---|---|---|
| 781,624 | Sterling | Jan. 31, 1905 |
| 1,021,880 | Neble et al. | Apr. 2, 1912 |
| 1,029,045 | Boyum | June 11, 1912 |
| 1,107,821 | Mesta | Aug. 18, 1914 |
| 1,774,791 | Dunbeck | Sept. 2, 1930 |
| 2,316,938 | Dimick | Apr. 20, 1943 |
| 2,493,824 | Noros | Jan. 10, 1950 |
| 2,836,315 | Fuhrmann | May 27, 1958 |